United States Patent [19]

Harris et al.

[11] Patent Number: 5,150,331
[45] Date of Patent: Sep. 22, 1992

[54] METHOD FOR ENHANCING SEISMIC DATA

[75] Inventors: Stephen L. Harris, Calgary, Canada; Dennis A. Yanchak, Richmond, Tex.

[73] Assignee: Amoco Corporation, Chicago, Ill.

[21] Appl. No.: 674,622

[22] Filed: Mar. 25, 1991

[51] Int. Cl.$^5$ ............... G01V 1/36; G01V 1/24
[52] U.S. Cl. .......................... 367/50; 367/73; 364/421; 364/924.5
[58] Field of Search .............. 367/45, 50, 51, 53, 367/73; 382/54; 364/421, 924.5

[56] References Cited

U.S. PATENT DOCUMENTS

| | | | |
|---|---|---|---|
| 3,697,939 | 10/1972 | Musgrave | 367/53 |
| 4,209,854 | 6/1980 | Ruehle . | |
| 4,894,809 | 1/1990 | Moeckel | 367/51 |
| 4,907,205 | 3/1990 | Yanchak . | |
| 4,992,992 | 2/1991 | Dragoset | 367/21 |
| 5,073,876 | 12/1991 | Propes | 367/73 |

OTHER PUBLICATIONS

Thorsen et al., 57th Annu. Soc. Explor. Geophys. Int ortg Oct. 15, 1987, pp. 458–460, p. No. 53-3; abstract only provided.

Maber et al., Same meeting at above in R.; pp. 471–473, p. No. S3-7; abstract only provided.

*Primary Examiner*—Nelson Moskowitz
*Attorney, Agent, or Firm*—Timothy D. Stanley

[57] ABSTRACT

A method for enhancing seismic data is described for attenuating undesired coherent noise in both stacked seismic signals as well as in unstacked ordered gathers of seismic signals. In particular, coherent noise, as represented by reflection events, is identified to be attenuated, and a datum line is constructed in the seismic data. Each seismic signal can then be nonhyperbolically time-shifted so as to align the identified reflection event with the datum line. The seismic data can then be filtered with a dip filter having a dip angle corresponding to that of the datum line to attenuate the aligned reflection event.

20 Claims, 6 Drawing Sheets

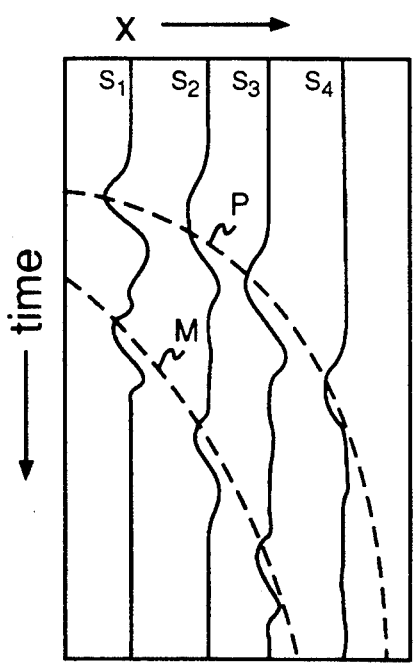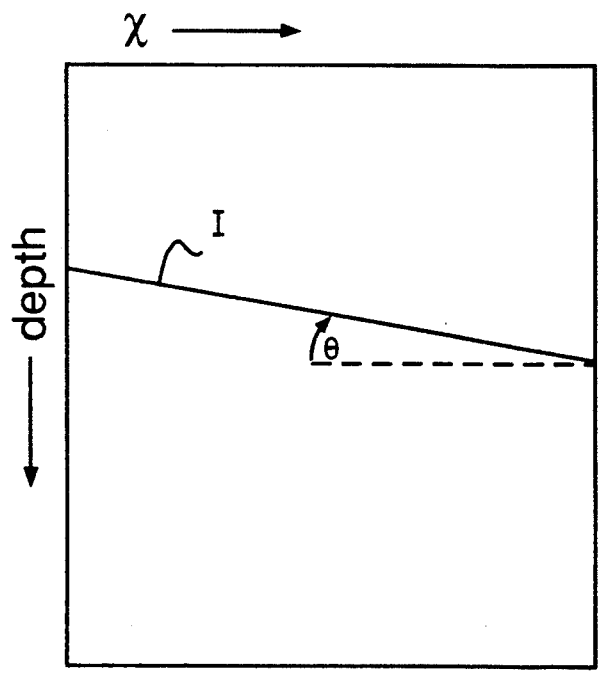
Fig. 3b
Fig. 3a

METHOD FOR ENHANCING SEISMIC DATA

BACKGROUND OF THE INVENTION

The present invention relates generally to a method of geophysical exploration and more particularly to a method for enhancing seismic data by attenuating undesired coherent noise in the seismic data.

In seismic prospecting, it is conventional to place a plurality of seismic receivers along the earth's surface at spaced locations. A plurality of seismic sources disposed at spaced locations along the earth's surface can then be activated to generate seismic waves which propagate outwardly in all directions. Vibrating devices, explosive devices, and impulsive devices are all exemplary of such seismic sources. Seismic waves thus generated are reflected, refracted, and diffracted from subsurface formation interfaces, and some of these diverted seismic waves are detected by the seismic receivers and can be processed to form a seismic signal. Such seismic signals can be displayed as seismic sections which contain information about the time, duration and intensity of the diverted seismic waves. Seismic sections can be studied to extrapolate information regarding the type and location of subsurface formations producing the diverted seismic waves. This information can, in turn, be employed to evaluate subsurface formations for oil- and gas-bearing potential.

Seismic energy which has generally been reflected only once from a reflecting subsurface interface is commonly referred to as a primary reflection event, whereas seismic energy which has been reflected more than once from a reflecting subsurface interface is commonly referred to as a multiple reflection event. Such reverberating seismic energy can produce multiple or secondary reflection events in the seismic data from one or more reflecting interfaces in the earth. Consequently, the presence of multiple reflection events or, more simply, multiples in the seismic data can result in confusing and oftentimes noninterpretable seismic data.

One method for attenuating multiple refraction events in the seismic data is to sort the seismic data into common depth point (CDP) gathers of seismic signals, normal moveout (NMO) correct the seismic signals of the CDP gather, and then dip filter the NMO corrected seismic data as described by Ruehle in U.S. Pat. No. 4,209,854. Such technique, however, is dependent upon differences in normal moveout velocities between the multiples and primary reflection events. Moreover, only a single choice of velocity per reflection event in the NMO moveout correction is permitted for each gather of seismic signals or for each iteration of the NMO correction.

More recently, Yanchak described in U.S. Pat. No. 4,907,205 a method for attenuating multiples by first sorting the seismic data into common end point (CEP) gathers of seismic signals, aligning selected multiples employing a two parameter moveout correction (i.e., moveout velocity and dip angle) and then spatially filtering the seismic signals to attenuate the aligned multiples. The effectiveness of such approach is not limited by the requirement that moveout velocities for primary and multiple be different; however, such technique nonetheless limits the choice of moveout velocity and dip angle to a single choice per reflection event for each iteration. Consequently, a need exists for an efficient method for removing coherent noise events in general, and multiple reflection events, in particular, which have any combination of spatially or temporally varying moveout velocities or dip angles.

SUMMARY OF THE INVENTION

A method for enhancing seismic data is described for attenuating coherent noise in both stacked seismic signals as well as in unstacked ordered gathers of seismic signals. In particular, coherent noise, as represented by reflection events in the seismic signals, is selected to be attenuated and a datum line is constructed in the seismic data. The selected reflection event in each seismic signal can then be nonhyperbolically time-shifted so as to be aligned with the datum line. The nonhyperbolic time-shift can comprise either a static time-shift function or stretch-squeeze time-shift function. The seismic data can then be filtered with a dip filter having a dip angle corresponding to that of the datum line. The dip filter can be either passband or reject band filter. The datum line is constructed so as to be nonhyperbolic and in one embodiment of the invention, the datum line is linear. The present invention will be more completely described in the following description and accompanying figures.

BRIEF DESCRIPTION OF THE DRAWINGS

FIG. 2b represents a CDP gather of seismic signals $S_i$ collected at any position X in FIG. 2a;

FIG. 3a represents a cross section of the earth's subsurface and a planar reflecting interface I having a constant dip angle $\theta$, and FIG. 3b represents a CEP gather of seismic signals collected at any position X in FIG. 3a;

FIG. 4b represents a CEP gather of seismic signals collected at position A in FIG. 4a;

DETAILED DESCRIPTION OF THE INVENTION

In order to better understand the present invention, the following introductory comments are provided. In seismic data acquisition, seismic energy can be imparted into the earth at a plurality of spaced locations along the earth's surface, and the earth's response thereto can be recorded at a plurality of spaced locations along the earth's surface and a plurality of seismic signals can thus be generated representative of the earth's response to the imparted seismic energy. The recorded seismic signals can include useful information about the earth's subsurface structure in the form of primary reflection events as well as coherent noise and random noise, neither of which is desirable. Typically, such seismic signals can be sorted into ordered gathers (common depth point—CDP; common end point—CEP; common offset COS) and thereafter further processed with a 2-D filter (e.g., dip filter) so as to attenuate unwanted coherent noise in the seismic signals while enhancing desired features to obtain a display generally representative of the earth's subsurface structure.

Examples of such unwanted coherent noise in seismic signals are groundroll, refractions and multiples. Multiple reflection events, or more simply multiples, represent reverberating seismic energy from one or more reflecting interfaces in the earth's subsurface as distinguished from primary reflection events which represent seismic energy which has been reflected only once from a reflecting interface. While the following discussion will focus on attenuation of multiples, those skilled in the art will appreciate that the present invention is ideally suited for attenuating all forms of coherent noise.

Figure 1:
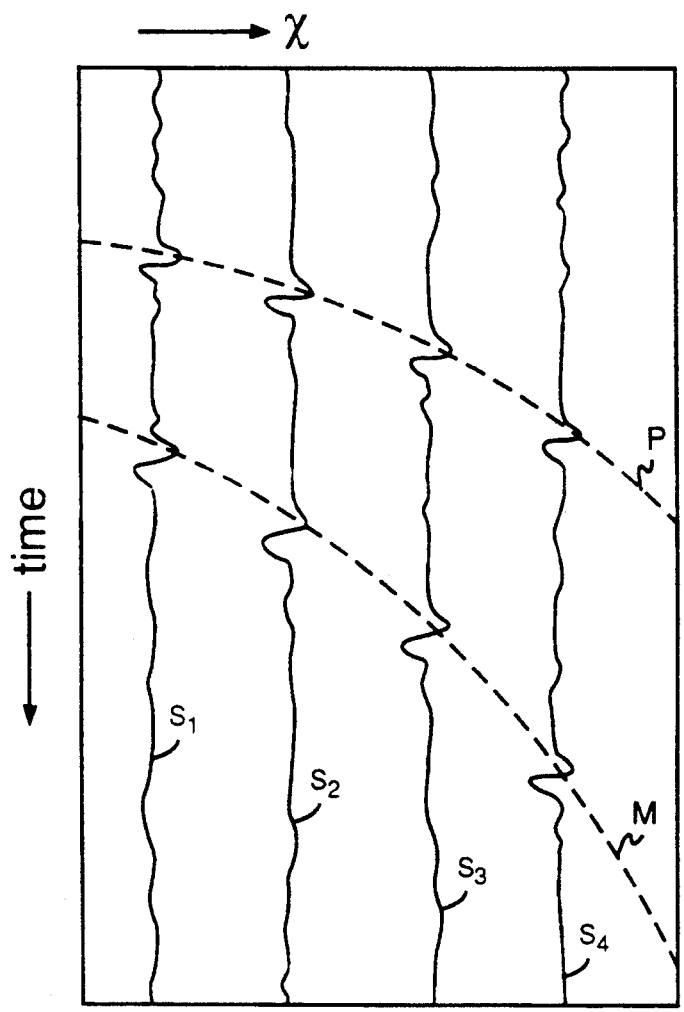
FIG. 1 represents a common depth point gather of seismic signals having both primary and multiple reflection events.

Looking now to FIG. 1, a CDP gather of seismic signals $S_i$ is depicted having both primary reflection events, which are generally aligned along dashed line P, and multiple reflection events, which are generally aligned along dashed line M. Rather than being helpful, explorationists generally consider that the reverberating energy represented by the multiples is confusing and thus unwanted and undesired. As such, removal or attenuation of coherent noise generally, and multiples specifically, from the seismic data is considered highly desirable.

Figure 2B:
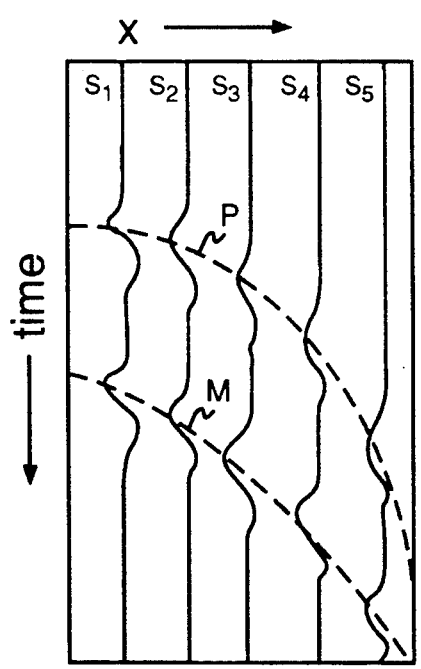
Figure 2A:
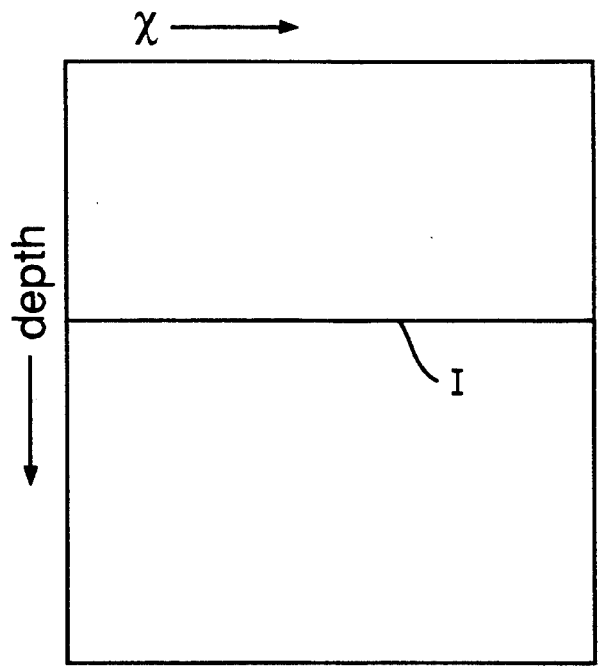
FIG. 2a represents a cross section of the earth with a generally horizontal and planar reflecting interface I.

Looking now to FIG. 2a, a generally horizontal and planar reflecting interface I in the earth's subsurface is depicted. FIG. 2b is generally representative of a CDP gather of synthetic seismic signals $S_i$ collected at any position X in FIG. 2a. The distance x in FIG. 2b represents the horizontal offset distance between source and receiver. In particular, the seismic signals $S_i$ of FIG. 2b include both primary as well as multiple reflection events from interface I. Since the reflecting interface I is generally horizontal and planar, both primary and multiple reflection events are said to be hyperbolic since they can be aligned along hyperbolic curves P and M, indicated by their respective dashed lines. The primary and multiple reflection events can then be hyperbolically time-shifted employing a hyperbolic time-shift function according to:

$$t = (t_0^2 + (x/v)^2)^{\frac{1}{2}} \quad (1)$$

where
$t_0$ = normal incidence two-way traveltime
x = offset distance; and
v = moveout velocity.

Provided that the moveout velocities for primary and multiple reflection events represented in FIG. 2b are different, one can readily separate and align the two using Equation (1) and, in combination with a simple dip filter, attenuate the unwanted multiples. However, if the moveout velocities are generally the same or the reflecting interface is not generally horizontal and planar, Eqn. (1) is inadequate for separating and aligning multiple and primary reflection events so as to be able to attenuate the undesired multiple with a simple dip filter.

Looking now to FIG. 3a, a generally planar reflecting interface I having a constant dip angle $\theta$ is depicted. FIG. 3b is generally representative of a common endpoint (CEP) gather of synthetic seismic signals $S_i$ collected at any position X in FIG. 3a. The distance x in FIG. 3b represents the horizontal offset distance between source and receiver. In particular, the seismic signals $S_i$ of FIG. 3b include both primary and multiple reflection events from interface I. Since the reflecting interface I is generally planar with constant dip angle $\theta$, both primary and multiple reflection events are said to be hyperbolic since they can be aligned along hyperbolic moveout curves P and M, indicated by their respective dashed lines. The primary and multiple reflection events can then be hyperbolically time-shifted employing a hyperbolic time-shift function according to:

$$t = \left( t_0^2 + (x/v)^2 + \frac{2(t_0 x \sin\theta)}{v} \right)^{\frac{1}{2}} \quad (2)$$

Thus, Eqn. (2) provides a mechanism for separating and aligning and separating multiple and primary reflection events if either the moveout velocities are different or the reflecting interface I has a constant, non-zero, dip angle $\theta$ and in combination with a simple dip filter remove the unwanted multiples. However, both Eqns. (1) and (2) are limited employing either one moveout velocity and/or a single dip angle $\theta$ per reflection event.

Figure 4B:
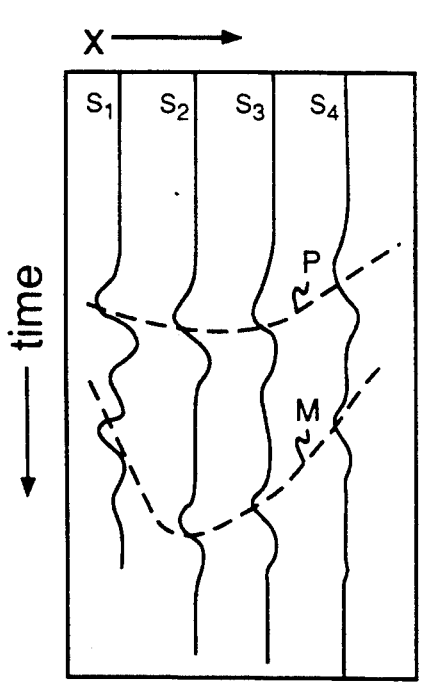
Figure 4A:
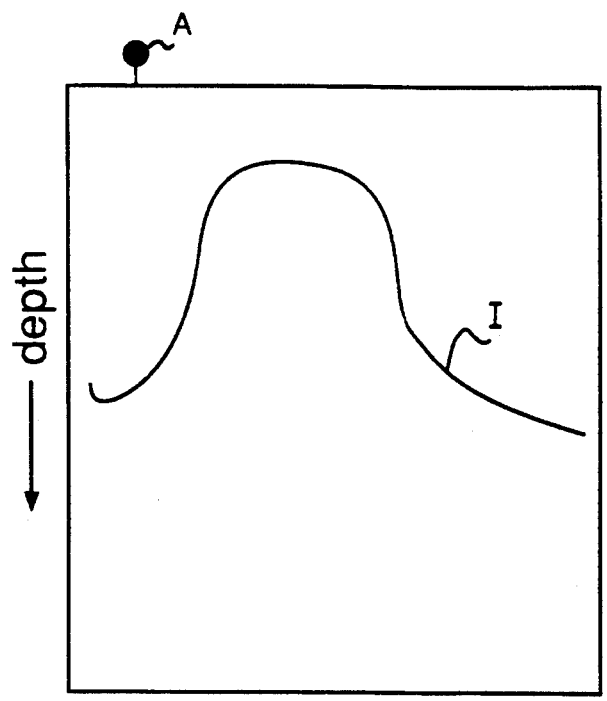
FIG. 4a represents a cross sectional of the earth's subsurface and a undulating or nonplanar reflecting interface I.

Unfortunately, not all multiples are generated from generally planar reflecting interfaces as represented in both FIGS. 2 and 3 (whether horizontal or inclined); rather, the most troublesome multiples can be generated from nonplanar or undulating reflecting interfaces. Looking now to FIG. 4a, a generally nonplanar or undulating reflecting interface I having a varying dip angle $\theta$ is depicted. FIG. 4b is generally representative of a CEP gather of synthetic seismic signals $S_i$ collected at location A in FIG. 4a. The distance x in 4b represents the horizontal offset distance between source and receiver. In particular, the seismic signals $S_i$ of FIG. 4b include both primary and multiple reflection events from interface I. Since the interface I is generally nonplanar with a varying dip angle $\theta$, the primary and multiples are said to be nonhyperbolic since neither can be aligned along a single line having a constant dip angle using the hyperbolic time-shift functions of either Eqn. 1 or 2. Consequently, constructing a dip filter, which is both temporally and spatially variant so as to follow the nonhyperbolic reflection events can be extremely complex and the processing of the seismic data with such a dip filter both time consuming and expensive.

Figure 5:
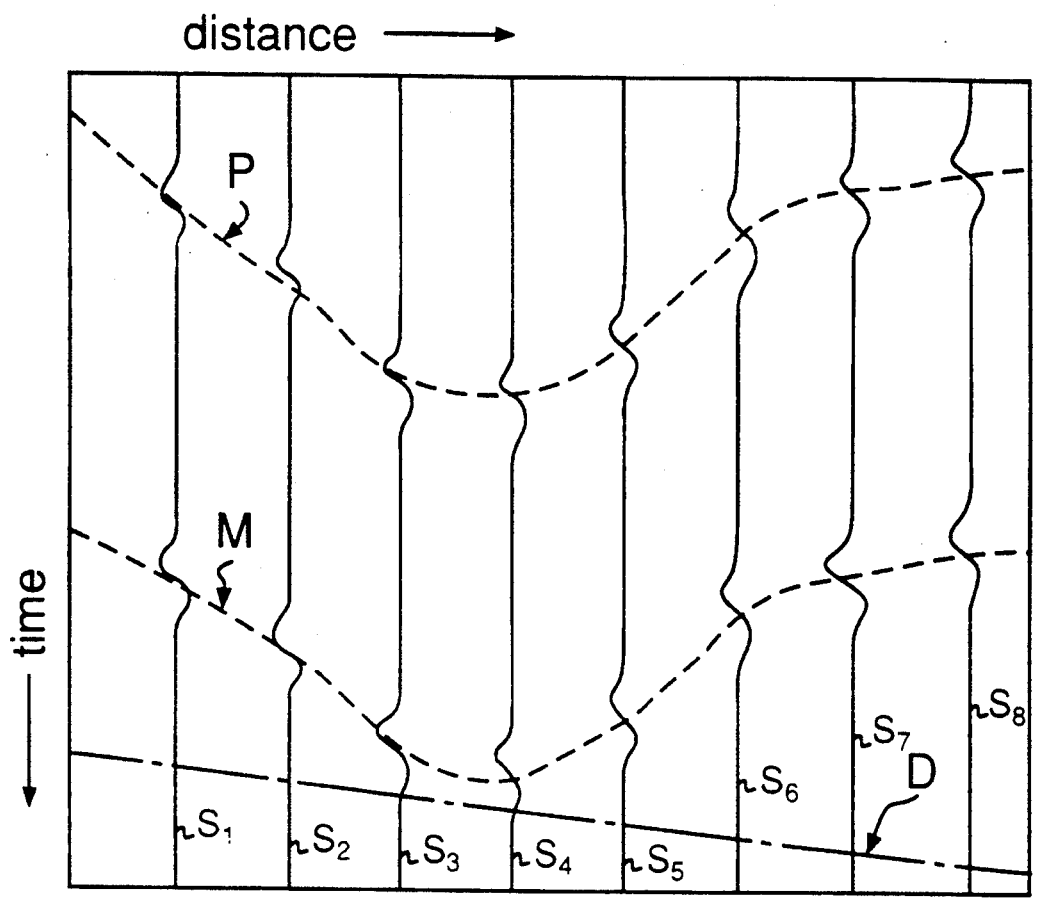
FIG. 5 represents a CDP stacked set of seismic signals having both primary and multiple reflection events.

While prior efforts have generally focused on attenuating multiples in unstacked seismic data (i.e., ordered gathers of seismic signals), the presence of multiples in stacked seismic data can be especially frustrating. FIG. 5 depicts the appearance of both multiple and primary reflection events from a nonplanar or undulating reflecting interface in the earth's subsurface in a set of stacked seismic signals $S_i$. In particular, the multiples fall along dashed line M as distinguished from the primary reflection events which fall along dashed lined P. Most troublesome to the geophysicist is the inability to readily align such reflection events since they already represent the result of normal moveout correction (whether using Eqns. 1 or 2) and summing. Consequently, alignment schemes more complicated than either Eqn. (1) or (2) must be developed to align such reflection events or one must develop a more complex filter which is adapted to vary both spatially (as a function of X) and temporally (as a function of t) to follow such reflection event across the seismic data. While possible, both such approaches can be extremely time intensive as well as result in costly computer processing of seismic data.

Figure 6:
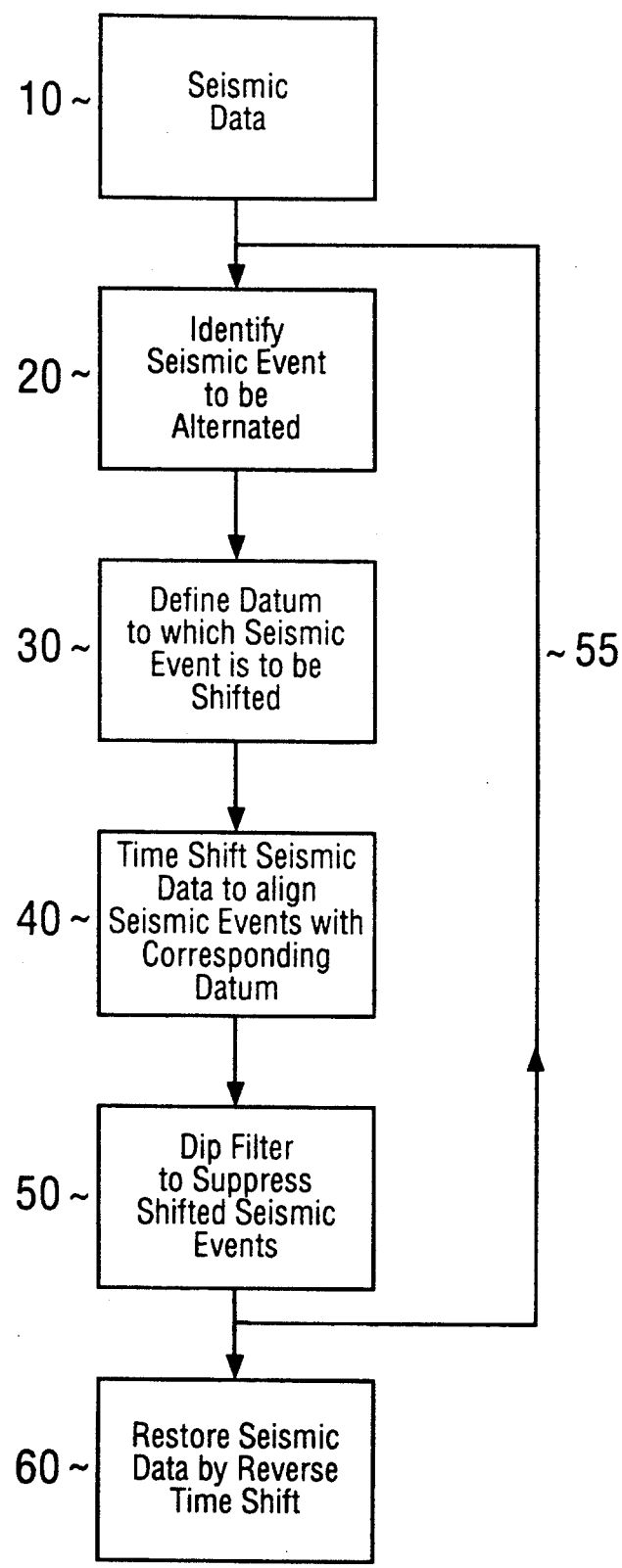
FIG. 6 represents a flow diagram of the present invention.

It is in this environment, that we have developed a novel method for enhancing seismic data by attenuating coherent noise, and in particular multiples, in the seismic data. Looking now to FIG. 6, the present invention will be described more completely. In particular, a set of seismic data is obtained at step 10. Such seismic data can include either unstacked seismic data (e.g., CEP, CDP, COS ordered gathers of seismic signals) or stacked seismic data (e.g., normal moveout corrected and summed seismic signals). While both unstacked and stacked sets of seismic data are amenable to processing by the present invention, the following discussion will focus on the attenuation of multiples in sets of stacked seismic data. At step 20, a reflection event to be attenuated is selected by a geophysicist. As will be appreciated by those skilled in the art of geophysics, such reflection event can be either a primary or multiple reflection event. For purposes of simplifying the remaining discussion and unless otherwise identified, the selected reflection events are multiples.

The essence of prior processing methods to attenuate multiples has been to "bend" the filter to match the data; whereas the present invention "bends" the data to match the filter. In particular, an arbitrary nonhyperbolic datum line D can be constructed in the seismic data at step 30. Preferably, the datum line D, as depicted in FIG. 5, is linear (i.e., having a constant dip angle $\theta$). Generally, it will be understood that while any constant dip angle $\theta$ will suffice, a constant dip angle of 0° (i.e., horizontal) is preferred. After the datum line D has been established, each seismic signal in the set of seismic data is nonhyperbolically time-shifted so that the selected reflection event in each seismic signal $S_i$ is aligned with the datum line D at step 40.

At this point, it is important to further discuss various nonhyperbolic time-shift methods whereby alignment of the selected reflection event with the datum line D can be achieved. In one embodiment, the nonhyperbolic time-shift comprises a static time-shift function adapted to align the selected reflection event of each seismic signal with the datum line D. In this case, the seismic signals $S_i$ are not distorted but rather simply moved up or down, much like a stick. In another embodiment, one or the other of the end points of each seismic signal $S_i$ or alternatively, both end points are fixed and the nonhyperbolic time-shift comprises a stretch-squeeze time-shift function whereby each seismic signal $S_i$ is stretched on one side of the reflection event and squeezed on the other side until the selected reflection event contained therein is aligned with the datum line D, much like a rubber band. Those skilled in the art will appreciate that such stretch-squeeze functions distort the seismic signal. As such, the amount of stretch and/or squeeze employed should be kept to a minimum to reduce problems in subsequent filtering of the seismic data. In particular, care must be taken not to stretch the seismic data past its Nyquist frequency. In the first case, the time-shift comprises a static function ($\Delta t$), and in the second case the stretch-squeeze time-shift comprises a stretch-squeeze function (t, $\Delta t$) both of which are applied on a signal-to-signal basis so as to accurately follow the reflection event as it changes with changes in the reflecting structure of the earth's subsurface.

Having now nonhyperbolically aligned the selected reflection events with the datum line D, a simple two-dimensional filter can be applied to the seismic data at step 50 to pass or reject the aligned reflection event. Preferably, a dip filter can be constructed to attenuate aligned reflection events having a selected range of dips. Preferably, the dip filter is designed to pass or reject reflection events having generally the same dip angle as the datum line D. Typically, this can be implemented using a notch or narrow band FK filter. The amount of attenuation achieved is thus controlled by the relationship of the dip angle of the datum line D to the dip angle of the dip filter as well as by the bandwidth of the selected FK filter. Those skilled in this art will appreciate that such dip filters are typically constructed to operate in the FK domain (i.e., frequency-wavenumber) and, as such, prior to applying the dip filter, the seismic data are first transformed from the t-x domain (time, space) to the FK domain employing conventional methods. By way of feedback, line 55, steps 20–50 can be repeated to develop additional datum lines $D_i$ for additional selected reflection events.

Upon completion of the attenuation of the unwanted multiples and noise from the seismic data, the filtered seismic signals are time-shifted so as to restore the initial time sequence of the seismic data. Thereafter, the seismic data can be further processed if desired.

Having thus described the present invention in detail, those skilled in the art will recognize that improvements thereto will readily come to mind without departing from the scope of the claims appended herewith. In particular, it will be appreciated that multiples simply represent one form of coherent noise in seismic data and the present invention is ideally suited for attenuating all forms of coherent noise.

We claim:

1. A method for enhancing seismic data comprising a set of seismic signals, including the steps of:
   (a) identifying coherent noise events in the seismic signals to be attenuated;
   (b) constructing a datum line in the time-space (t-x) domain of the seismic data;
   (c) nonhyperbolically time-shifting the identified coherent noise events for aligning them with the datum line;
   (d) transforming the time-shifted seismic data from the t-x domain to the frequency-wavenumber (fk) domain; and
   (e) two-dimensionally filtering the seismic data in the fk domain for attenuating the coherent noise events aligned with the datum line.

2. The method of claim 1, wherein the seismic signals comprise stacked seismic signals.

3. The method of claim 1, wherein the seismic signals comprise ordered gathers of seismic signals.

4. The method of claim 1, wherein the datum line has a substantially constant dip angle.

5. The method of claim 1, wherein the seismic signals are nonhyperbolically time-shifted with a static time-shift function to align the identified coherent noise events with the datum line.

6. The method of claim 4, wherein the two-dimensional filter comprises a dip filter having a narrow reject band corresponding to the constant dip angle of the datum line.

7. The method of claim 1, wherein the seismic signals are nonhyperbolically time-shifted with a stretch-squeeze time-shift function to align the coherent noise events with the datum line.

8. The method of claim 1, further including time-shifting the filtered seismic data to restore it to its original time sequence.

9. The method of claim 8, further including repeating the steps (a)–(d) of claim 1 for attenuating additional coherent noise events.

10. A method for enhancing seismic data, comprising a stacked set of seismic signals, including the steps of:
 (a) identifying reflection events to be attenuated in the stacked set of seismic signals;
 (b) constructing a datum line in the stacked set of seismic signals;
 (c) nonhyperbolically time-shifting selected of the seismic signals for aligning the identified reflection events with the datum line; and
 (d) applying a dip filter to the time-shifted seismic signals for attenuating the aligned reflection events.

11. The method of claim 10, wherein the identified reflection events are chosen from the group comprising coherent noise events and primary reflection events.

12. The method of claim 10, further including nonhyperbolically time-shifting the stacked seismic signals with a static time-shift function until the identified reflection event in each stacked seismic signal is aligned with the datum line.

13. The method of claim 10, further including nonhyperbolically time-shifting the stacked seismic signals with a stretch-squeeze time-shift function until the identified reflection event in each stacked seismic signal is aligned with the datum line.

14. The method of claim 13, further including holding one end of each stacked seismic signal fixed before nonhyperbolically time-shifting with the stretch-squeeze time-shift function.

15. The method of claim 13, further including holding both ends of each stacked seismic signal fixed before nonhyperbolically time-shifting with the stretch-squeeze time-shift function.

16. The method of claim 13, wherein the dip filter comprises a reject band filter.

17. The method of claim 13, wherein the dip filter comprises a passband filter.

18. A method for enhancing seismic data, comprising a set of stacked seismic signals, including the steps of:
 (a) identifying reflection events in the stacked seismic signals to be attenuated;
 (b) constructing a datum line in the time space (t-x) domain of the seismic data;
 (c) nonhyperbolically time-shifting first coherent reflection events for aligning them with the datum line;
 (d) filtering the time-shifted seismic data for attenuating the first coherent reflection events aligned with the datum line;
 (e) repeating steps b, c, and d for attenuating second coherent reflection events in the seismic data; and
 (f) nonhyperbolically time-shifting the filtered seismic data to restore the original time sequence in the seismic data.

19. The method of claim 18, wherein the datum line has a constant dip angle.

20. The method of claim 18, wherein the step of filtering comprises:
 (a) transforming the seismic data in the t-x domain to the frequency-wavenumber (fk) domain; and
 (b) filtering the seismic data in the fk domain with a two-dimensional filter for attenuating coherent reflection events aligned with the datum line.

* * * * *